April 28, 1964 P. L. AARON 3,130,627
MUSICAL TEACHING DEVICE
Filed April 19, 1962 3 Sheets-Sheet 1

INVENTOR
Phillip L. Aaron

BY Alvin Browdy
ATTORNEY

INVENTOR
Phillip L. Aaron

April 28, 1964            P. L. AARON            3,130,627

MUSICAL TEACHING DEVICE

Filed April 19, 1962            3 Sheets-Sheet 3

INVENTOR
Phillip L. Aaron

BY    *Alvin Browdy*

ATTORNEY

3,130,627
MUSICAL TEACHING DEVICE
Phillip L. Aaron, 330 Michigan Ave.,
Miami Beach 39, Fla.
Filed Apr. 19, 1962, Ser. No. 188,638
8 Claims. (Cl. 84—471)

The present invention relates to a teaching device, and more particularly to a device for teaching music students and others various scale patterns, and to help in explaining the transposition of a scale pattern from one starting note to another.

The standard piano keyboard has white-key notes which, from one C to that C an octave higher thereby has the major (and from A to A the "natural minor") scale pattern(s). In playing the piano, and other musical instruments, it is necessary to transpose the scale patterns from one starting note to another when compositions to be played are in keys other than "C major" and "A minor." A problem arises in this transposition because the white keys of the initial or starting scales (of C and A) are not congruent with the white keys available in the other keys. Consequently, pitch alterations and sharps and flats result from the necessity of having to employ the black keys to obtain intermediate pitches or semitones, as well as white keys. The concept is often extremely difficult to impart to beginning students.

An object of the present invention is to provide a teaching device by which the necessary pitch alterations in playing compositions of varying keys may be readily observed and understood.

Another object of the present invention is to provide a musical teaching device having moveable key block elements which may be shifted to illustrate different "keys."

Yet another object of the present invention is the provision of a musical teaching device having few parts.

A further object of the present invention is to provide a musical teaching device comprising a simulated keyboard, which is portable, rugged in construction and economical to fabricate.

Another object of the invention is to provide a musical teaching device which will encourage learning due to the provision of parts which are manipulated to provide solutions.

A further object is the provision of a musical teaching device enabling the above and other objects to be obtained when teaching instruments which are in keys other than C.

Other objects and many attendant advantages of the present invention will be readily understood from the following specification and drawings wherein.

Figure 1:
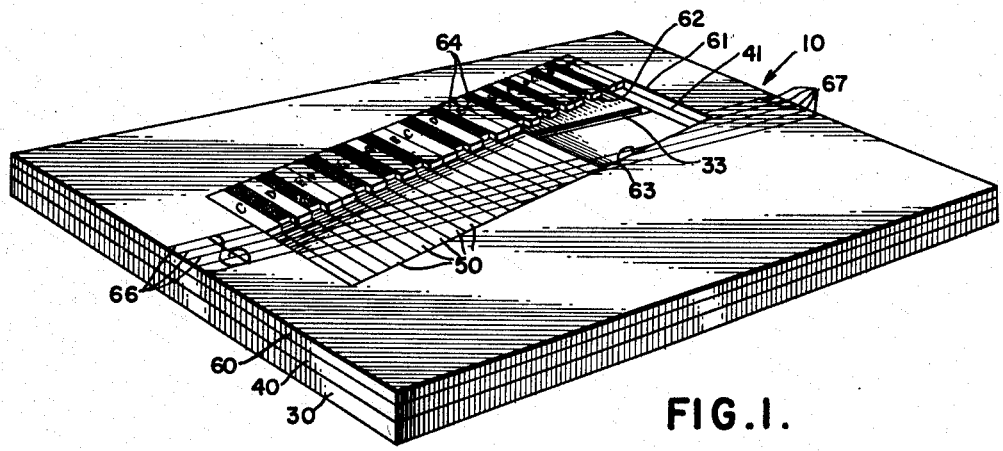
FIG. 1 is a perspective view of a musical teaching device in accordance with the present invention.

Referring now to the drawings, wherein like or corresponding reference numerals are applied to like or corresponding parts throughout the several views, there is shown in FIG. 1 a music teaching device 10 comprising an upper or face plate 60 having a generally rhomboidal window 61 therein, through which may be seen a plurality of keys 50. As may be observed from FIG. 2, the musical device 10 is made up of a plurality of plates and keys, and as will be hereinafter set forth.

Figure 3:
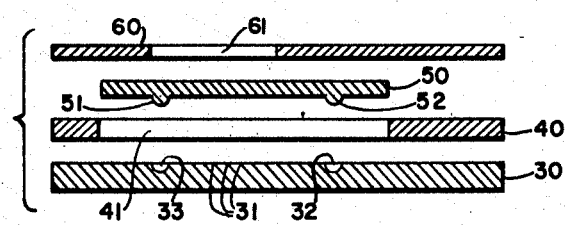
FIG. 3 is an exploded cross-sectional view taken on the line 3—3 of FIG. 2.
Figure 4:
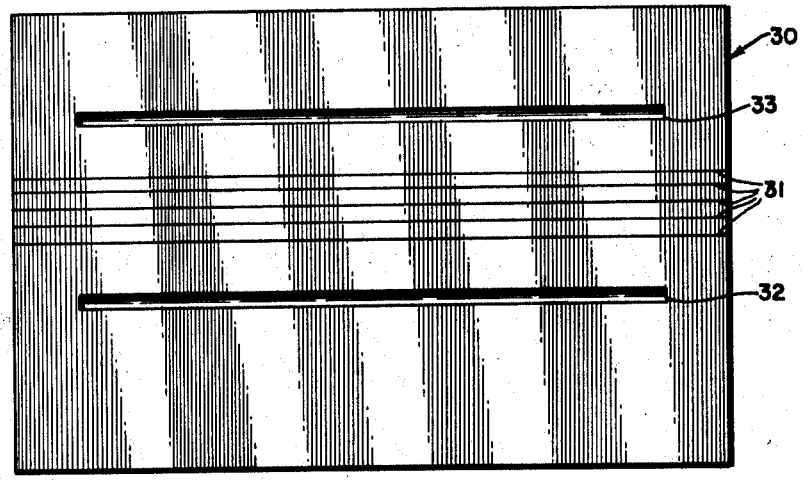
FIG. 4 is a plan view of a base plate forming part of the present invention.

In FIG. 3 there is shown the base plate 30, base plate 30 being generally rectangular in configuration and having a set 31 of five lines of a musical staff extending thereacross. In the upper surface of base plate 30 are a pair of grooves 32 and 33, the grooves 32 and 33 being parallel to the lines 31 on the upper surface of base plate 30. Slots may be used in place of grooves in some embodiments.

Figure 5:
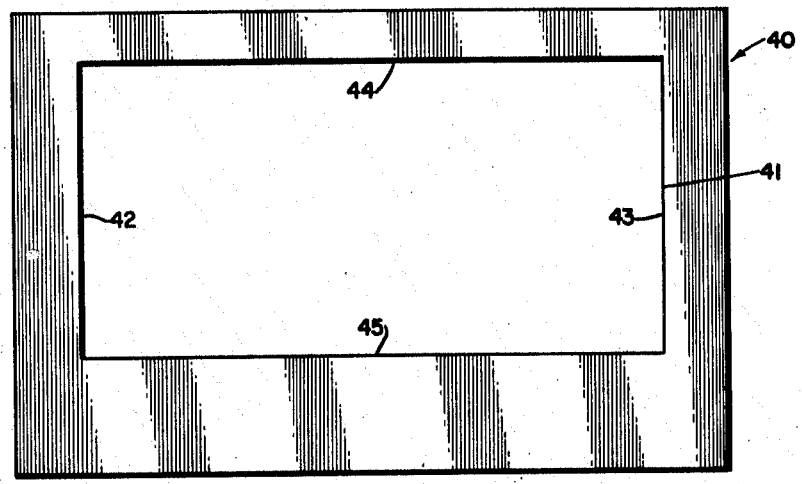
FIG. 5 is a plan view of an intermediate plate forming a part of the present invention.
Figure 6:
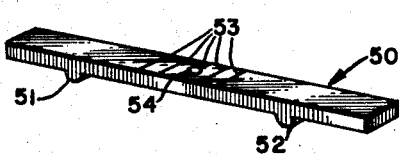
FIG. 6 is a perspective view of a key block forming a part of the present invention.

In FIG. 5 there is shown an intermediate plate 40 which is of generally the same size and shape as the base plate 30, intermediate plate 40 having a generally rectangular opening 41 therein with side margins 42 and 43 and an upper margin 44 and a lower margin 45.

Each of the key blocks 50, as shown by the exemplary block of FIG. 5, is of generally longitudinal shape, similar to that of a piano key. Key block 50 has a pair of transverse ribs 51 and 52 on the underside thereof, the ribs 51 and 52 being parallel and spaced the same distance apart as the grooves 32 and 33 in base plate 30 so as to ride therein. In the assembled device the grooves 32 and 33 will serve as guides for transverse sliding movement of the several key blocks 50 across the base plate 30. Each key block 50 has the lines 53 of a musical staff on the upper surface thereof, and as will be observed hereinafter these staff lines are in registry with the staff lines on the base plate in the assembled device. Also, each key block 50 is provided with a musical head note symbol 54 on the upper surface thereof. The key blocks 50 will vary, one from another, in the placement of the musical head note symbol so that a group of the key blocks 50 will have musical head note symbols collectively extending over a predetermined pitch range.

Figure 7:
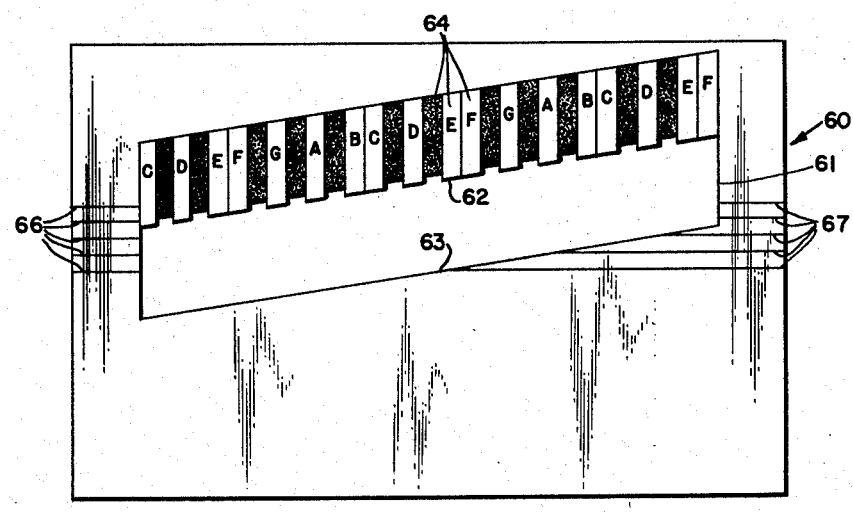
FIG. 7 is a plan view of a face plate of the present invention.

Referring now to FIG. 7, there is shown the face plate 60 which is of generally the same shape and dimensions as the other plates of the device 10, face plate 60 having a window generally designated 61 which is of substantially rhomboidal shape. The upper margins 62 and the lower margins 63 of window 61 are inclined upwardly from left to right, and adjacent upper margin 62 is a representation 64 of a segment of piano keyboard containing both black and white keys. Face plate 60 is also provided near its left and right margins with aligned musical staff lines 66 and 67.

Figure 2:
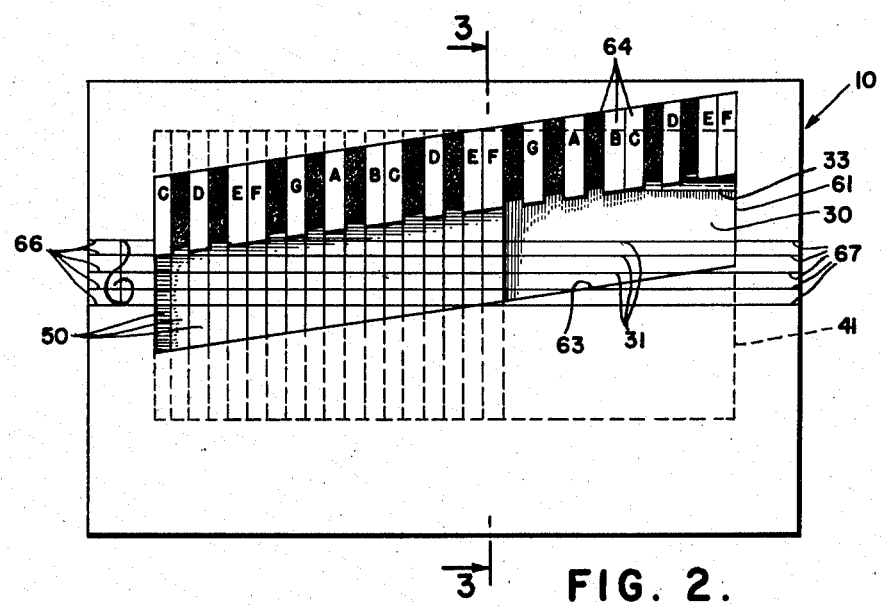
FIG. 2 is a plan view of the device.

The several parts of the device 10 are assembled, the relationship being shown in FIGS. 1 and 2. With reference to FIG. 2, there may be seen the base plate 30 with the grooves 32 and 33 into which the ribs 51 and 52 of the key blocks 50 will fit. Also, key block 50 will lie within the opening 41 of intermediate plate 40, and face plate 60 will overlie the key blocks 50 and intermediate plate 40, and will serve to retain the key blocks 50. When device 10 is assembled, the staff lines 31 on base plate 30, the staff lines 54 on key blocks 50 and the staff lines 66, 67 are in registry.

In teaching transposition with the aid of the device 10, the parts of the device 10 are positioned as shown in FIGS. 1 and 2, with the key blocks 50 aligned with their appropriate white keys of the keyboard representation 64 and the musical note head symbols in the usual ascending order as a result. By shifting the key blocks 50 to the right or left, the principles of sharping and flatting may be readily conveyed to a student, as well as the concept of transposition when a particular composition is not in the usual or normal key.

Figure 8:
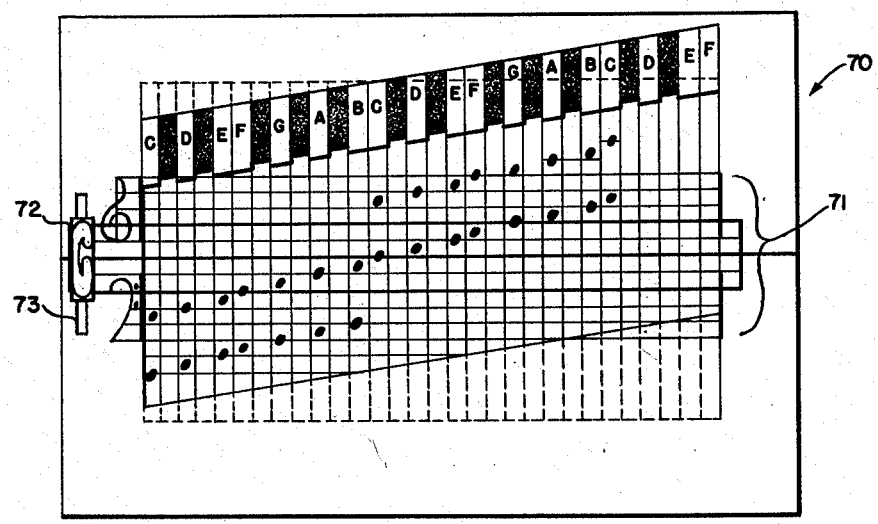
FIG. 8 is a fragmentary plan view of an embodiment of the invention for teaching transpositions for instruments built in keys other than C.

In FIGURE 8 there is illustrated an embodiment of the invention for teaching transposition in connection with instruments built in keys other than C. These instruments are notated not at the pitch sounded, called "concert," but at the pitch they have to play notationally to produce the "concert" pitch. For example, a clarinet built in B-flat produces a sound one whole-tone lower than written.

To teach the student to read this discrepancy, the device 70 shown in FIG. 8 is provided, this device being distinguished by having a grand staff 71 of eleven lines, which encompasses the bass, alto and treble pitch ranges, and further by having a block 72 carrying a C-clef symbol and movable in a vertical slot 73.

Thus, a student learning on a B-flat clarinet may be taught to read the discrepancies between notational representation and actual sound by moving the block 72 with the C-clef symbol so that the fourth line on a staff becomes C. Any note on the fourth line is, therefore, a C and will have the same sound as any other C-note where there has been octave transposition into the correct pitch range.

There has been provided a device for teaching scale patterns and scale pattern transposition. The device of the present invention readily illustrates the principles of sharping and flatting, and is easily understood by music students. Thus, pitch alterations and composition key differences may be readily explained through the use of the invention described hereinabove.

There has also been provided a device for teaching scale patterns and scale pattern transposition in connection with instruments built in keys other than C.

It will be obvious to those skilled in the art that various changes may be made without departing from the spirit of the invention and therefore the invention is not limited to what is shown in the drawings and described in the specification.

What is claimed is:

1. A teaching device for music comprising a base plate having the lines of a musical staff extending across the upper surface thereof, a pair of parallel grooves in the upper surface of said base plate parallel to said staff lines, an intermediate plate on said base plate and substantially coextensive therewith said intermediate plate having a generally rectangular opening therein above said staff lines and grooves, a plurality of longitudinal key blocks in said opening in said intermediate plate and supported on said base plate, said key blocks each having two transverse ridges on the bottom surface thereof extending into said two grooves in said base plate to thereby guide said key blocks in a transverse sliding movement across said base plate, each said key block having the lines of a musical staff on the upper surface thereof and in registry with the musical staff lines on the base plate, each said key block further having a musical note head symbol on the upper surface thereof, said key blocks as a group having musical note head symbols collectively extending over a predetermined pitch range, and a face plate overlying said intermediate plate, said face plate having a rhomboidal window with upper and lower margins inclined upwardly from left to right, a representation of a plurality of piano keys adjacent the upper margin of said window, each of said piano keys having a width substantially equal to the width of said key blocks, and a set of musical staff lines at least one lateral edge of said window in registry with the staff lines on said base plate.

2. The device of claim 1, and a block on said face plate, a C-clef symbol on said block, and means on said block and face plate enabling said block to be moved transversely of the direction of said staff lines.

3. A teaching device for music comprising a base plate having the lines of a musical staff extending across the upper surface thereof, guide means on said base plate upper surface parallel to said staff lines, an intermediate plate on said base plate having a generally rectangular opening therein above said staff lines, a plurality of longitudinal key blocks in said opening in said intermediate plate and supported on said base plate, means on said key blocks engaging said base plate guide means for guiding said key blocks in a transverse sliding movement across said base plate, each said key block having the lines of a musical staff on the upper surface thereof and in registry with the musical staff lines on the base plate, each said key block further having a musical note head symbol on the upper surface thereof, said key blocks as a group having musical note head symbols collectively extending over a predetermined pitch range, and a face plate overlying said intermediate plate, said face plate having a rhomboidal window with upper and lower margins inclined upwardly from left to right, a representation of a plurality of piano keys adjacent the upper margin of said window, each of said piano keys having a width substantially equal to the width of said key blocks, and a set of musical staff lines at least one lateral edge of said window in registry with the staff lines on said base plate.

4. The device of claim 3, and a block on said face plate, a C-clef symbol on said block, and means on said block and face plate enabling said block to be moved transversely of the direction of said staff lines.

5. The device of claim 4, said face plate having a second set of staff lines thereon parallel to said first set.

6. In a teaching device for music, a face plate having a rhomboidal window therein with upper and lower margins inclined, a representation of a plurality of piano keys adjacent one said margin of said window, a set of musical staff lines extending beyond at least one lateral edge of said window, a plurality of key blocks, each key block being of width substantially equal to the width of each of said piano keys, means supporting said key blocks for sliding movement beneath and transversely of said window, each said key block having the lines of a musical staff and a note head symbol on the upper surface thereof, said lines being parallel to said set of staff lines, said key blocks as a group having musical note head symbols collectively extending over a predetermined pitch range.

7. The device of claim 6, and a block on said face plate, a C-clef symbol on said block, and means on said block and face plate enabling said block to be moved transversely of the direction of said staff lines.

8. The device of claim 7, said face plate having a second set of staff lines thereon parallel to said first set.

References Cited in the file of this patent

UNITED STATES PATENTS

| | | |
|---|---|---|
| 658,902 | Turner | Oct. 2, 1900 |
| 1,637,478 | Downs | Aug. 2, 1927 |

FOREIGN PATENTS

| | | |
|---|---|---|
| 136,874 | Great Britain | Dec. 17, 1919 |
| 539,044 | Germany | Nov. 23, 1931 |
| 552,712 | Germany | June 18, 1932 |
| 507,330 | Belgium | Dec. 15, 1951 |